United States Patent [19]

Barson

[11] Patent Number: 4,953,392
[45] Date of Patent: Sep. 4, 1990

[54] TIRE TEST MACHINE

[75] Inventor: Clifford W. Barson, Staffs, Great Britain

[73] Assignee: Sumitomo Rubber Industries, Limited, Hyogo, Japan

[21] Appl. No.: 424,341

[22] Filed: Oct. 19, 1989

[30] Foreign Application Priority Data

Nov. 9, 1988 [GB] United Kingdom ............... 8826217

[51] Int. Cl.$^5$ ........................................... G01M 17/02
[52] U.S. Cl. ....................................................... 73/146
[58] Field of Search .................................. 73/146, 8, 9

[56] References Cited

U.S. PATENT DOCUMENTS 4,753,110 6/1988 Burchett et al. ....................... 73/146
4,848,143 7/1989 Ushikoshi ............................... 73/146

Primary Examiner—Donald O. Woodiel
Attorney, Agent, or Firm—Birch, Stewart, Kolasch & Birch

[57] ABSTRACT

A tire test machine which provides four attitudes of motion to the tire comprising a pair of triangular upper and lower main suspension frames each lying in a horizontal plane and having a first long side extending in the direction of movement of the test road surface, one end of the long side of each frame pivotally connected to the upper and lower ends of a vertically extending axle support, load applying means acting on one of the long sides, upper and lower actuators applying horizontal movement to the third corners of the upper and lower main frames parallel to the long sides and a steering means so that the upper and lower actuators may act together to provide tire lateral movement proportional to the average movement and chamber movement proportional to the difference of the movements.

6 Claims, 2 Drawing Sheets

TIRE TEST MACHINE

BACKGROUND OF THE INVENTION

The present invention relates to a tire test machine and in particular to a tire and wheel mounting assembly providing four attitudes of motion to the tire.

Tire test machines of this type typically use a rotating drum or other moving surface in place of the road surface and mount the tire on its wheel in a suspension system which loads the tire onto the moving surface and, by using force tranducers, allows for measurement of the forces generated between the tire and the "road".

A problem with such test machines, however, is to provide means for applying lateral and camber movements to generate lateral force and camber force in a controlled manner so that the true situation in a vehicle can be simulated.

An object of the present invention is to provide improved means to apply lateral and camber movements without affecting the application of tire load or vertical movement.

SUMMARY OF THE INVENTION

According to one aspect of the present invention a tire test machine comprises a moving road surface and a tire and wheel suspension system comprising a pair of triangular upper and lower main suspension frames each lying substantially in a horizontal plane and having a first long side extending substantially in the direction of movement of the road surface. One end of the first long side of each frame is mounted at one corner to a fixed machine frame by a pivot bearing and the other ends of each of the first long sides are pivotally connected to the upper and lower ends respectively of a vertically extending axle support. A wheel bearing assembly is mounted to the axle support such that the mid portion the wheel axis substantially perpendicular to the direction of movement of the road and the long sides of the two parallel main suspension frames. Vehicles load applying means act between one of the first long sides and the machine frame to apply a vertical load. An upper actuator between the third corner of the upper main frame and the machine frame applies a horizontal movement to said third corner in a direction parallel to the first side. A lower actuator acting parallel to the first actuator applies a horizontal movement to the third corner of the lower machine frame and a steering means connected to the wheel hub causes rotation about the axle support such that the upper and lower actuators act together to provide tire lateral movement proportional to the average movement of the actuators and camber movement proportional to the difference of the said movements.

Preferably the steering means comprises a steering arm projecting from the axle support and wheel bearing assembly in the direction of the wheel axis and steering rod is provided with actuation means to provide the steering motion.

The wheel load applying means preferably comprises a vertically extending force rod pivotally connected at one of its ends to the first long side of one of the main suspension frames and at the other end to a load generating actuator which is a pair of hydraulic springs acting on either side of a third frame mounted substantially parallel to the upper and upper main suspension frames and pivotally mounted to the machine frame such that the two springs act on opposite sides of the third frame.

The load actuators may be hydraulic actuators may be operated by air or may be jacks. In a preferred arrangement one of the hydraulic actuators has a hydraulic damper in parallel therewith.

BRIEF DESCRIPTION OF THE DRAWINGS

Further aspects of the present invention will be become apparent from the following description, by way of example only, of one embodiment in conjunction with the attached diagrammatic drawings wherein.

DETAILED DESCRIPTION OF THE INVENTION

Figure 1:
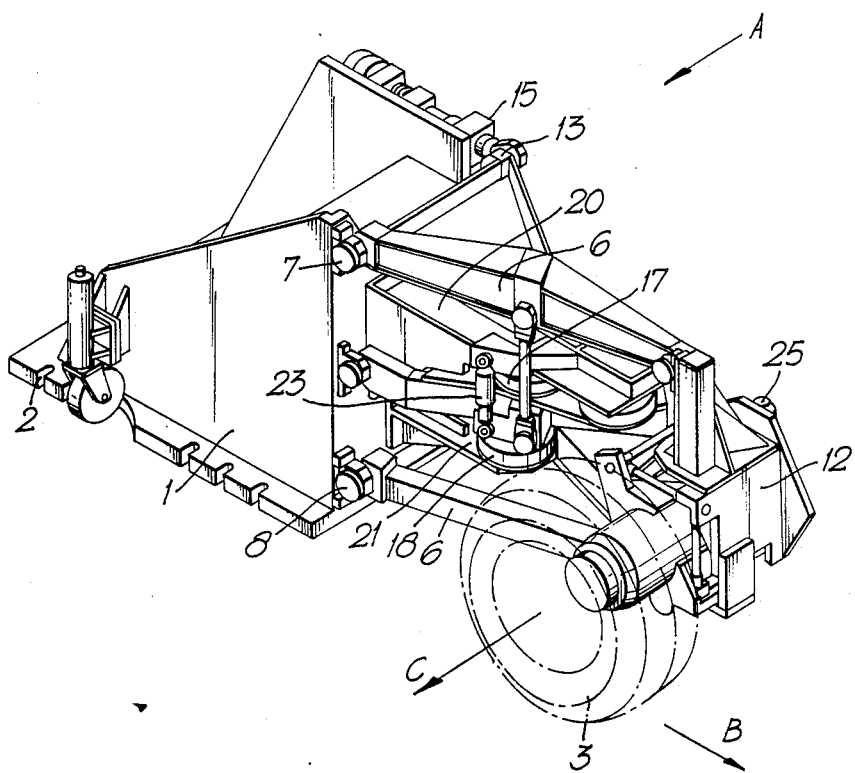
FIG. 1 is a perspective view of the test machine shown without the moving road surface.
Figure 2:
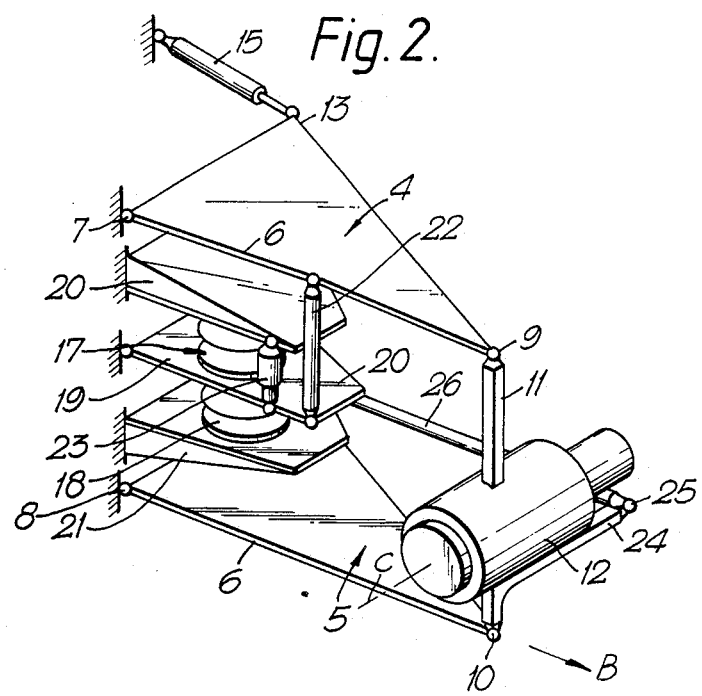
FIG. 2 is a diagrammatic view of the important elements of the machine shown in FIG. 1 from the same view point.
Figure 3:
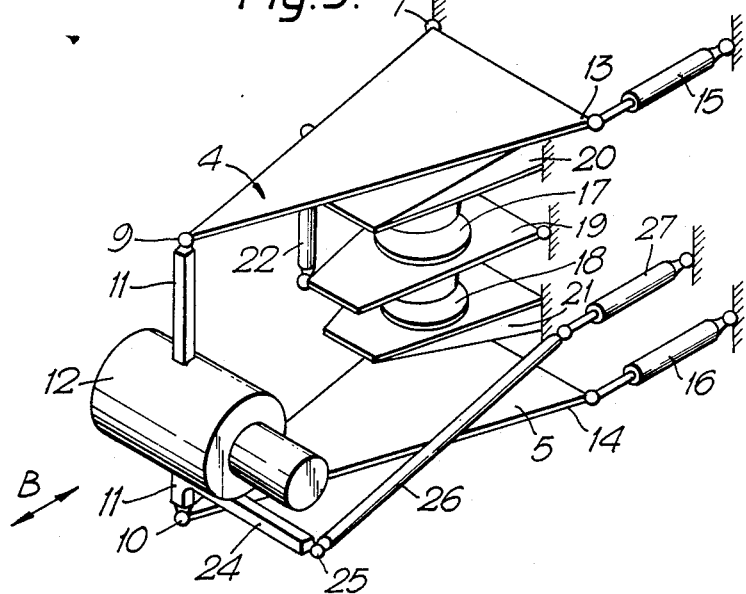
FIG. 3 is a perspective view of the machine in FIG. 1 taken in the direction of arrow A.

The tire test machine shown in FIG. 1 comprises a main mounting frame 1 provided with hold down means 2 so that the frame can be rigidly mounted. The test machine mounts a tire and wheel assembly 3 above a moving road (not shown) which moves in the direction of arrow B. The moving road surface may be on a drum or a flat bed machine both as known in the art.

The suspension for the wheel rim assembly comprises an upper and lower main suspension frame 4, 5 both of which are triangular in plan. The two suspension frames 4 and 5 each comprise a first long side 6 which extends in the direction of arrow B i.e. appropriately perpendicular to the axis C of the tire and wheel rim assembly 3. One end of each of the long sides 6 is mounted to the main frame 1 by a pivot joint 7, 8. The other ends 9 and 10 of the long sides 6 are connected by further pivot joints to the uppper and lower ends, respectively, of a vertically extending axle support member 11. The assembly is such that the two upper and lower main suspension frames 4 and 5 are parallel and vertical movement of the axle support 11 is possible in the conventional parallel wishbone manner.

A wheel bearing assembly 12 is mounted in the axle support 11 and provided with drive and braking means (not shown).

The third corners 13 and 14 of the upper and lower main frames 4, 5 respectively, are connected by universal joints to horizontally disposed actuators 15 and 16, both which are mounted to the main frame 1 and which act in the direction B as shown.

Thus the actuators 15 and 16 provide means for giving lateral and camber motion to the wheel 3 as will be described later.

In the space between the parallel main suspension frames 4 and 5, is mounted a load applying means which comprises a pair of air springs 17 and 18 mounted vertically one on either side of a third triangular frame 19. The triangular frame 19 is pivotly mounted on the machine frame 1 so that it may move in parallel with the upper and lower frames 4 and 5. The opposite ends of the two air springs 17 and 18 abut fixed reaction members 20 and 21 which are rigidly mounted on the main frame 1. The third frame 19 has its free end 20 attached to the middle of the long side 6 of the upper main suspension arm 4 by means of a vertically extending force transmitting rod 22. A hydraulic damper 23 is mounted in parallel with the upper air springs 17. A steering arm 24 integral with the the wheel bearing assembly 12 projects in the direction of the axis C away from tire 3 and is connected by a pivot bearing 25 to a steering arm 26 which extends parallel to the lay sides 6 towards the main frame 1 to which it is connected by a linear actuator 27 so that the steering movement can be applied to the tire and wheel assembly 3. The steering arm length is the same as the effective length of the sides 6.

The machine apart from the actuators described is provided with force and displacement sensing means of conventional types (not shown) to allow measurement of the forces applied, the displacements applied, and the reaction forces from the tire.

Operation of the machine will be self evident. Vehicle load on the tire is applied by means of the two air springs 17 and 18 as is vertical displacement to stimulate uneven road surfaces on a vehicle. Steering forces and displacements are applied by the actuator 27 and drive and braking forces are applied by the drive and braking means within the wheel hub 12.

Lateral and camber motions and forces are provided by means of the two actuators 15 and 16. The average value of the two actuators motions is proportional to the tire lateral motion and the difference between the values of the two actuator motions is proportional to the camber. This provision of lateral and camber motions acts independently of the load applied to the vehicle wheel and independently of the steering motion and thus provides great flexibility in the movements and forces applied to the tire.

Driving and braking conditions can be obtained by applying and relevent torque to the drive and brake means in the wheel bearing assembly 12 or alternatively by a circulating power system. The latter may be obtained by using a similar or simplified test machine arrangement of opposite hand with the protruding shafts of each which drive the wheels connected through a torque measuring device. By running different sizes of tires of the two machines and connecting the drum or flat bed arrangements together different degrees of braking or driving are then obtained.

Various types of actuators may be used in place of the linear actuators shown, and these may be powered by various means including hydraulic means. Alternative main suspension springs may be used as may alternative dampers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A tire test machine involving a moving road surface and a tire and wheel suspension system, which comprises a pair of triangular upper and lower main suspension frames, each lying substantially in a horizontal plane and having a first long side extending substantially in the direction of movement of the road surface, one end of the first long side of each frame being mounted at one corner to a fixed machine frame by a pivot bearing and the other ends of each of the first long sides being pivotally connected to the upper and lower ends respectively of a vertically extending axle support, a wheel bearing assembly mounted to the axle support such that in the mid portion, the wheel axis is substantially perpendicular to the direction of movement of the road and the long sides of the two parallel main suspension frames, vehicle load applying means acting between one of the first long sides and the machine frame to apply a vertical load, an upper actuator disposed between the third corner of the upper main frame and the machine frame to apply a horizontal movement to said third corner in a direction parallel to the first side, a lower actuator acting parallel to the first actuator to apply a horizontal movement to the third corner of the lower machine frame, and a steering means connected to the wheel hub to cause rotation about the axle support such that the upper and lower actuators act together to provide tire lateral movement proportional to the average movement of the actuators and camber movement proportional to the difference of the said movements.

2. The tire test machine according to claim 1 wherein the steering means comprises a steering arm projecting from the axle support and wheel bearing assembly in the direction of the wheel axis, a steering rod positioned horizontally and parallel to the first long sides of the upper and lower main suspension frames and having the same length as the effective length of the long sides, and an actuator to move the steering rod.

3. The tire test machine according to claim 1 wherein the vehicle load applying means comprises a vertically extending force rod connected at one end to the first long side of one of the main suspension frames and at the other end to a load generating actuator.

4. The tire test machine according to claim 3 wherein the load actuator comprises a pair of opposed hydraulic springs acting on either side of a third frame, substantially parallel to the upper and lower main suspension frames, pivotally mounted to the machine frame in the vertical plane of the pivots mounting said two main frames and having its other end pivotally connected to the force rod.

5. The tire test machine according to claim 4 wherein a shock absorber or damper is mounted in parallel to one of the hydraulic actuators.

6. The tire test machine according to claim 5 wherein the hydraulic actuators are air springs.

* * * * *